US012616084B2

(12) United States Patent
Wu et al.

(10) Patent No.: US 12,616,084 B2
(45) Date of Patent: May 5, 2026

(54) AIR-MATERIAL MIXING AND SPRAYING ACTUATOR WITH AN APPLICATION METHOD THEREOF

(71) Applicant: Chengdu Worang Zhichuang Technology Partnership (Limited Partnership), Sichuan (CN)

(72) Inventors: Fucheng Wu, Chengdu (CN); Hu Yang, Chengdu (CN); Changyu Shi, Chengdu (CN); Xiaoming Liu, Chengdu (CN); Jialin Li, Chengdu (CN); Ling Ma, Chengdu (CN)

(73) Assignee: Chengdu Worang Zhichuang Technology Partnership (Limited Partnership), Chengdu (CN)

( * ) Notice: Subject to any disclaimer, the term of this patent is extended or adjusted under 35 U.S.C. 154(b) by 546 days.

(21) Appl. No.: 18/163,465

(22) Filed: Feb. 2, 2023

(65) Prior Publication Data

US 2024/0260505 A1 Aug. 8, 2024

(30) Foreign Application Priority Data

Dec. 13, 2021 (CN) .......................... 202111521937.X

(51) Int. Cl.
*A01C 23/02* (2006.01)
*A01C 21/00* (2006.01)

(52) U.S. Cl.
CPC ............ *A01C 23/026* (2013.01); *A01C 21/00* (2013.01)

(58) Field of Classification Search
CPC .............................. A01C 23/026; A01C 21/00
See application file for complete search history.

(56) References Cited

U.S. PATENT DOCUMENTS 5,050,340 A * 9/1991 Seifert ................. A01C 23/026
239/271

FOREIGN PATENT DOCUMENTS

DE 3819679 A1 * 12/1988 ............. A62C 31/22
GB 2240248 A * 7/1991 ........... A01C 23/026

* cited by examiner

*Primary Examiner* — Matthew R Buck
(74) *Attorney, Agent, or Firm* — Studebaker Brackett PLLC

(57) ABSTRACT

An air-material mixing and spraying actuator, which relates to the field of devices for spraying materials to deep soil. The actuator includes a material mixing and spraying pipe, a material temporary storage assembly, a second material supply assembly and a compressed air supply assembly, where a material discharge outlet is provided at one end of the material mixing and spraying pipe; the material temporary storage assembly is disposed at one end of the material mixing and spraying pipe to temporarily store materials; the second material supply assembly communicates with the material temporary storage assembly and sends materials to the material temporary storage assembly; and the compressed air supply assembly communicates with the material temporary storage assembly and provides high-pressure air that bursts the soil to form cracks or achieve an uplift effect, and spray the materials temporarily stored to the cracks in cooperation with the material temporary storage assembly.

9 Claims, 6 Drawing Sheets

AIR-MATERIAL MIXING AND SPRAYING ACTUATOR WITH AN APPLICATION METHOD THEREOF

TECHNICAL FIELD

The present invention relates to the field of devices for mixing, spraying and applying materials in deep soil, and in particular, to an air-material mixing and spraying actuator with an application method thereof.

BACKGROUND

At present, when fluidizable materials are excavated and applied in a deep soil layer (the depth of the soil layer is within 0.3-3 meters), a main way is to drill holes by using a drilling machine, and then pouring a formulated reagent (solid powder or liquid) into the holes so as to achieve that the reagent after penetrating through a cup wall formed by extrusion is naturally diffused in the soil layer through liquid permeation. Such way is not only low in work efficiency, but also poor in absorption of liquid reagents.

Thus, in order to make up for the above-mentioned deficiencies, the present application is hereby provided.

SUMMARY

The object of the present invention is to provide an air-material mixing and spraying actuator, which can achieve the large-scale and fast spraying of materials in deep soil, so that the work efficiency is increased while the utilization rates of materials and energy are effectively improved.

Embodiments of the present invention are implemented as follows:

an air-material mixing and spraying actuator includes a material mixing and spraying pipe, a material temporary storage assembly, a second material supply assembly and a compressed air supply assembly, where a material discharge outlet is provided at one end of the material mixing and spraying pipe; the material temporary storage assembly is disposed at one end of the material mixing and spraying pipe away from the material discharge outlet, and configured to temporarily store a material; the second material supply assembly communicates with the material temporary storage assembly, and is configured to send the material to the material temporary storage assembly; and the compressed air supply assembly communicates with the material temporary storage assembly, and is configured to provide high-pressure air that bursts the soil to form cracks (or to make cracks and splits come into being) or achieve an uplift effect, and simultaneously spray the materials temporarily stored in the material temporary storage assembly to the cracks in cooperation with the material temporary storage assembly.

Further, the material temporary storage assembly includes a shell and a rotating core, where the shell is disposed at the material mixing and spraying pipe, and provided with a first straight-through hole, a second straight-through hole and a third straight-through hole which respectively communicate with the material mixing and spraying pipe, the second material supply assembly and the compressed air supply assembly;

the rotating core is rotatably disposed in an inner cavity of the shell, has a temporary storage cavity, and is provided with a first central hole and a second central hole which communicate with the temporary storage cavity, and the central axes of the first central hole and the second central hole coincide with each other; and during the rotation of the rotating core, the temporary storage cavity can communicate with the first straight-through hole, the second straight-through hole and the third straight- through hole through the first central hole and the second central hole.

Further, a depression area is disposed on one side of the temporary storage cavity.

Further, the second material supply assembly includes a second conveying pipe, a second material bucket and a second conveying device; where one end of the second conveying pipe communicates with the second straight-through hole, and the second material bucket communicates with the second conveying pipe and is configured to send the material to the second conveying pipe; and the second conveying device is configured to send the material in the second conveying pipe to the temporary storage cavity.

Further, the second conveying device includes a cylinder body and a piston disposed in the cylinder body, a push rod is disposed at one end of the piston, the push rod is in transition fit with the second conveying pipe, and the length of the push rod is greater than that of the second conveying pipe.

Further, the second conveying device includes a second ball valve, the cylinder body, and the piston disposed in the cylinder body; where the second ball valve is disposed at the second conveying pipe, and can communicate with the second material bucket;

the cylinder body is located at one end of the second conveying pipe, away from the temporary storage assembly, the push rod is disposed at one end of the piston, the push rod is in transition fit with the inner cavity of the second ball valve, and the length of the push rod is greater than that of the second conveying pipe; and when the second ball valve rotates to communicate with the second material bucket, the material in the second material bucket enters the inner cavity of the second ball valve; and when the second ball valve continues to rotate to communicate with the second conveying pipe, the push rod pushes the material in the inner cavity of the second ball valve to the temporary storage cavity.

Further, the air-material mixing and spraying actuator also includes a pressured air material supply assembly, and the shell is provided with a fourth straight-through hole that communicates with the air-pressured material supply assembly; and during the rotation of the rotating core, the temporary storage cavity can communicate with the air-pressured material supply assembly.

Further, the air-pressured material supply assembly includes a first material bucket, an air-pressured conveying device and a first conveying pipe, where the first material bucket communicates with the first conveying pipe, and is configured to send the material to the first conveying pipe, one end of the first conveying pipe communicates with the fourth straight-through hole, and the other end thereof communicates with the air-pressured conveying device so as to send the material to the temporary storage cavity; and a control valve is disposed at the first conveying pipe.

Further, the rotating core is provided with a third central hole that communicates with the temporary storage cavity, the third central hole, the first central hole and the second central hole are located in the same rotation plane, and the central axis of the third central hole is perpendicular to that of the first central hole; and

when the rotating core rotates to the first central hole to communicate with the air-pressured material supply assembly, the third central hole communicates with the material mixing and spraying pipe, so that the material, after passing through the first central hole, the temporary storage cavity and the third central hole, directly enters the material mixing and spraying pipe.

Further, the compressed air supply assembly is a pneumatic shock wave generator.

An application method of the air-material mixing and spraying actuator includes the following steps:

S1: the rotating core rotates to the first central hole to communicate with the second material supply assembly, and the second central hole communicates with the air-pressured material supply assembly;

S2: the second material supply assembly starts, so that the material enters the temporary storage cavity;

S3: the rotating core rotates 90 DEG counterclockwise to the first central hole to communicate with the compressed air supply assembly, at this moment, the second central hole communicates with the material mixing and spraying pipe;

S4: the compressed air supply assembly starts, so that high-pressure air is released to pass through the temporary storage cavity, and carries the material to pass through the material mixing and spraying pipe to burst the soil to form cracks, and the material is sprayed to the cracks synchronously;

S5: the rotating core rotates 90 DEG counterclockwise to the first central hole to communicate with the compressed air supply assembly, at this moment, the third central hole communicates with the material mixing and spraying pipe; and S6: the air-pressured material supply assembly starts, the material in the air-pressured material supply assembly, after passing through the first central hole, the temporary storage cavity and the third central hole, enters the material mixing and spraying pipe, and finally enters the cracks.

The beneficial effects of the embodiments of the present invention are as follows:

According to the air-material mixing and spraying actuator provided in the embodiments of the present invention, the second material supply assembly can be adopted to send a material to be conveyed to the material temporary storage assembly first, and then, while the compressed air supply assembly sprays high-pressure air shock waves to the temporary storage assembly, the temporary storage assembly starts, so that the high-pressure air shock waves and the material enter the material mixing and spraying pipe synchronously, as a result, the high-pressure air shock waves carrying the material are subjected to synchronous suspended spraying and soil splitting, and then the soil is burst and split by the shock waves to form cracks or achieve an uplift effect while the material is diffusely distributed in each crack.

Through the above settings, the material and the high-pressure air shock waves can be mixed, sprayed and applied synchronously to carry out one shock wave splitting, which can not only achieve an effect of bursting and splitting the soil to form cracks, but also can spray the material to each crack or loose space, thereby improving the mixing degree of the material and the soil, increasing the work efficiency and reducing the energy consumption. In addition, the design of the first material supply assembly can increase the subsequent storage amount and replenishment amount of the material, thus further improving the scope of application of the device.

In general, the air-material mixing and spraying actuator provided by the present invention can achieve the large-scale and fast spraying of materials in deep soil, so that the work efficiency is increased while the utilization rates of materials and energy are effectively improved.

BRIEF DESCRIPTION OF THE DRAWINGS

To illustrate the technical solutions of the embodiments of the present invention more clearly, the following briefly introduces the attached drawings required to be used in the embodiments. It should be understood that the attached drawings below show merely some embodiments of the present invention, and therefore should not be regarded as a limitation of the scope. Those skilled in the art may still derive other relevant attached drawings from these attached drawings without creative efforts.

DETAILED DESCRIPTION OF THE EMBODIMENTS

Figure 1:
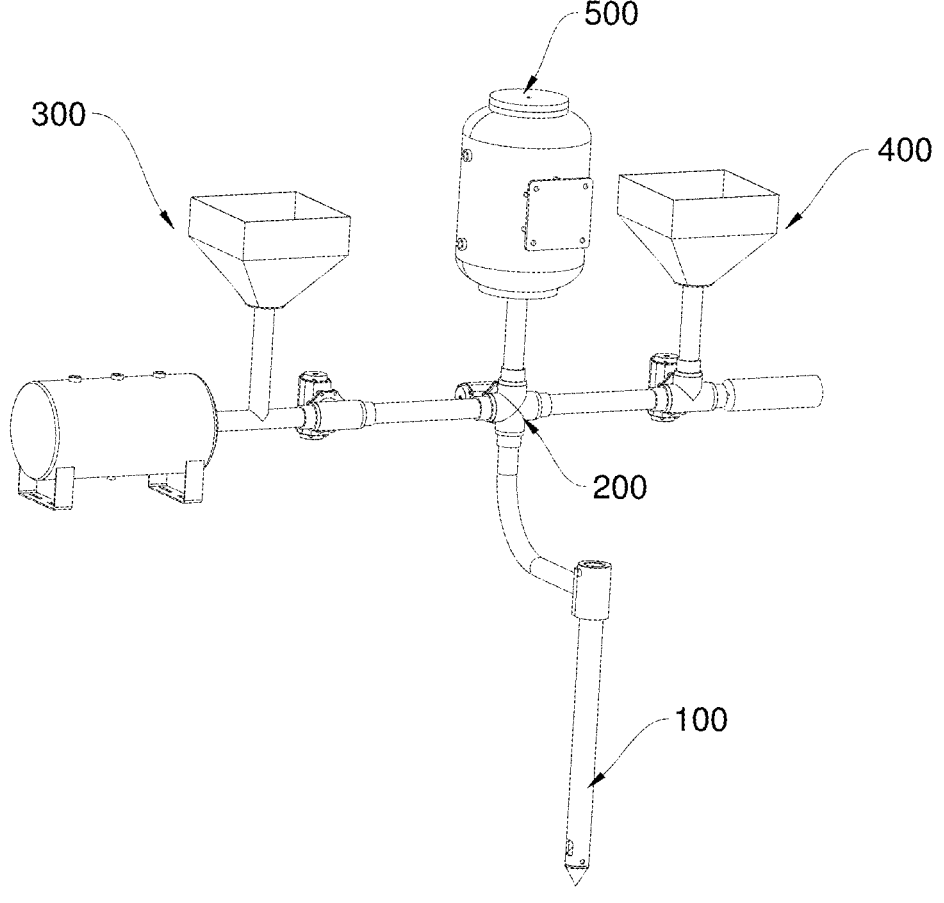
FIG. 1 shows the three-dimensional drawing of the actuator according to an embodiment of the present invention.
Figure 2:
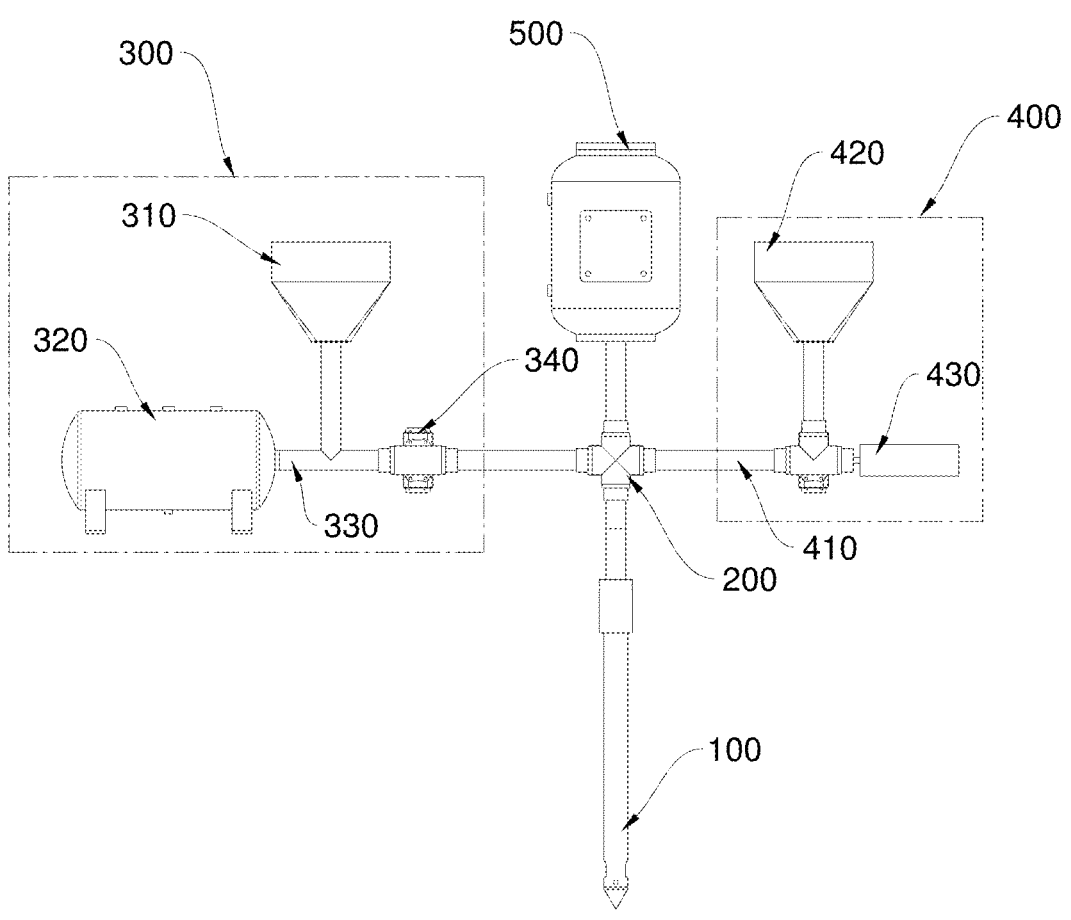
FIG. 2 shows a front view of the actuator according to the embodiment of the present invention.
Figure 3:
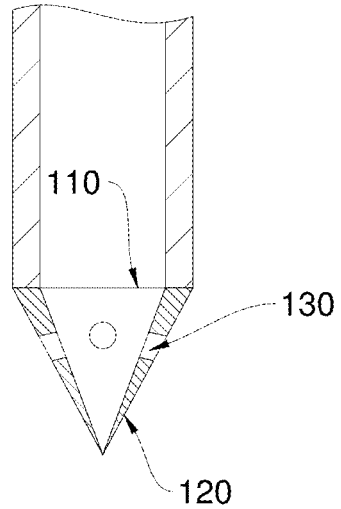
FIG. 3 shows a structural schematic drawing of the material mixing and spraying pipe according to the embodiment of the present invention.
Figure 4:
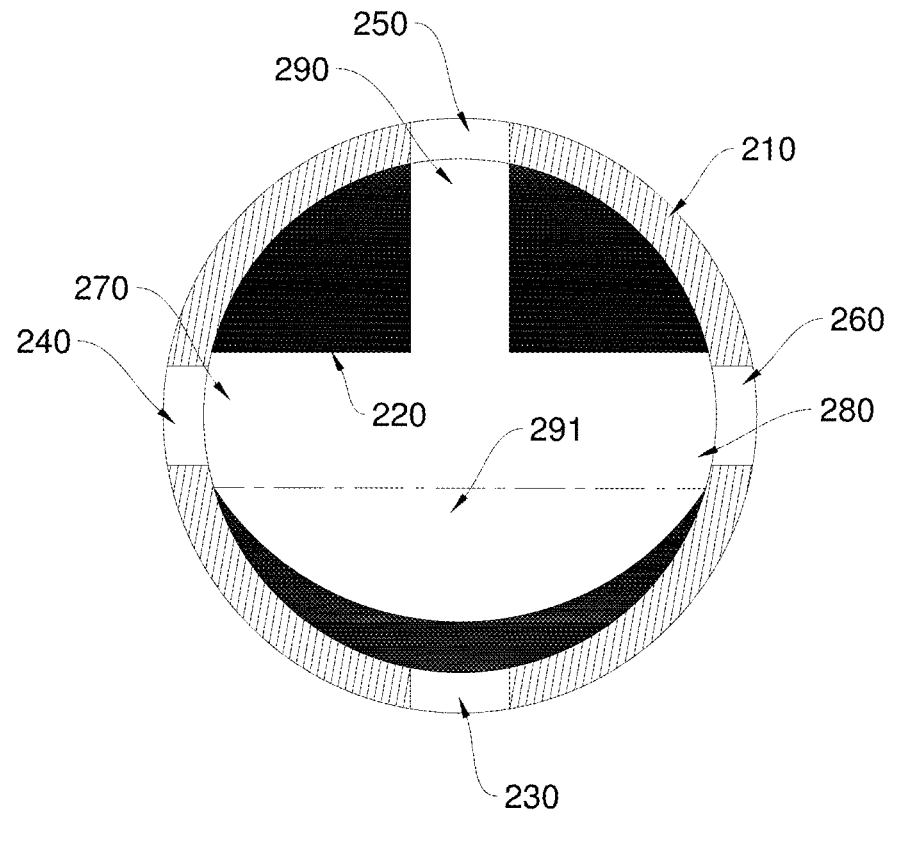
FIG. 4 shows a structural schematic drawings of the material temporary storage assembly according to the embodiment of the present invention.

To make the object, technical solution, and advantages of the embodiments of the present invention clearer, the following clearly and completely describes the technical solutions in the embodiments of the present invention with reference to the attached drawings in the embodiments of the present invention. Apparently, the described embodiments are merely a part rather than all of the embodiments of the present invention. The assemblies in the embodiments of the present invention, generally described and shown in the attached drawings herein, may be arranged and designed in various configurations.

Accordingly, the following detailed description of the embodiments of the present invention provided in the attached drawings is not intended to limit the scope of the present invention claimed for protection, but merely to show selected embodiments of the present invention. Based on the embodiments of the present invention, all other embodiments obtained by those skilled in the art without creative efforts shall fall within the scope of protection of the present invention.

It should be noted that similar reference numerals and letters refer to similar items in the following attached drawings, so once an item is defined in one attached drawing, it does not need to be further defined and interpreted in subsequent attached drawings.

In the description of the present invention, it will be appreciated that the orientation or position relationships indicated by the terms "center", "up", "down", "left", "right", "vertical", "horizontal", "inside", "outside" and the like are the orientation or position relationships shown based on the attached drawings, or the orientation or position relationships that the products of the present invention are usually placed when in use, and adopted only for facilitating the description of the present invention and simplifying the description, rather than indicating or implying that a device or element referred to must have a specific orientation, or to be constructed and operated in a particular orientation, therefore, the orientation or position relationships cannot be construed as a limitation of the present invention. Moreover, the terms "first", "second", 30 "third", etc. are only used to distinguish descriptions, and cannot be understood as indicating or implying relative importance.

Moreover, the terms "parallel", "vertical", and the like do not indicate that parts are required to be absolutely parallel or vertical, but can be slightly tilted. For example, "parallel" simply indicates that its orientation is more parallel than "vertical", and does not indicate that the structure must be completely parallel but can be slightly tilted.

Moreover, the terms "horizontal", "vertical", "overhung" and the like do not indicate that parts are required to be absolutely horizontal or overhung, but can be slightly tilted. For example, "horizontal" simply indicates that its orientation is more horizontal than "vertical", and does not indicate that the structure must be completely horizontal but can be slightly tilted.

In the description of the present invention, it also will be appreciated that unless otherwise expressly specified and defined, the terms "setting", "installation", "linage" and "connection" shall be understood in a broad sense, for example, the term "connection" may be understood as fixed connection, removable connection, or integrated connection; and may be understood as direct connection, or indirect connection through an intermediate medium, or may be internal communication of two components. For persons of ordinary skill in the art, the specific meaning of the above terms in the embodiments of the present disclosure may be understood according to specific circumstances. cl EMBODIMENT First, it will be appreciated that the present application is a further improvement of research and development of the applicant on the basis of his previous application, so as to overcome the deficiencies in the previous application;

A Chinese patent for a utility model, of which the application number is CN201921303565.1, is a prior patent of the applicant, and disclose "a pneumatic parallel active device for spreading a material to deep soil, comprising a material spreading gun, a soil penetrating device located on an upper portion of the material spreading gun, and an air burst system and a material application system both connected to the material spreading gun, where the air burst system and the material application system are connected in parallel to each other and to the material spreading gun; the air burst system comprises a high-pressure air cylinder a burst valve; and the material application system comprises a material chamber, a feeding valve, a first valve, a material delivery chamber, a second valve and a material conveying pipe sequentially connected to each other, and the material conveying pipe communicates with the interior of the material spreading gun. By using the device provided by the utility model, a specified amount of any material can be evenly applied to soil at any depth, thereby making conventional methods to be obsolete, greatly improving the operational efficiency of applying a material to deep soil, significantly reducing the costs of applying a material to deep soil, and reducing labor costs."

However, the device still has the following deficiencies in actual use: first, only a single material can be sprayed in the spraying and mixing process; and when different materials are sprayed and mixed, the materials need to be refilled and then sprayed, mixed and deeply applied, thus, the device is cumbersome in operation; second, when different materials are mixed and sprayed to the same spray point, the amount and depth of spraying and mixing are not easy to be controlled; and third, shock waves and material feeding are performed in two steps, in actual use, it is necessary to use the shock waves to burst the soil to form cracks, then the material is sprayed in a suspended mode, and burst again by using the shock waves so as to spray the material to the formed cracks, in such a way, the efficiency is low and the energy consumption in the process is large.

Moreover, a Chinese patent for a utility model, of which the application number is CN201921303573.6, is also a prior patent of the applicant, and disclose "a pneumatic parallel active device for spreading a material to deep soil, comprising a material spreading gun, an air burst system and a material application system both connected to the material spreading gun, the air burst system and the material application system being connected in parallel to each other and to the material spreading gun; where the air burst system comprises a burst generator, the material application system comprises a material chamber, a feeding valve, a first valve, a material delivery chamber, a second valve and a material conveying pipe sequentially connected to each other, and the material conveying pipe extends into the high-pressure air cylinder and communicates with the bottom thereof. By using the device provided by the utility model, a specified amount of any material can be evenly applied to soil at any depth, thereby making conventional methods to be obsolete, greatly improving the operational efficiency of applying a material to deep soil, significantly reducing the costs of applying a material to deep soil, and reducing labor costs."

However, the device still has the following deficiencies in actual use: first, only a single material can be sprayed in the application process; and when different materials are sprayed, it is necessary to refill the materials before being sprayed, therefore, the device is cumbersome in operation; second, when different materials are sprayed to the same spray point, the amount and depth of spraying are not easy to be controlled; and third, a time interval between a soil loosening process implemented by shock wave bursting and the front-positioned spraying of materials is relatively long, so that soil cracks formed by soil loosening are easy to recover to be as before, which is not conducive to the subsequent spraying, mixing and feeding of materials, and increases the difficulty, uniformity and distribution range of material distribution into the soil cracks.

Based on the deficiencies of the previous application, this embodiment provides an air-material mixing and spraying actuator, referring to FIG. 1-11, which includes a material mixing and spraying pipe 100, a material temporary storage assembly 200, an air-pressured material supply assembly 300, a second material supply assembly 400, and a compressed air supply assembly 500.

Where, a material discharge outlet 110 is provided at one end of the material mixing and spraying pipe 100; the material temporary storage assembly 200 is disposed at one end of the material mixing and spraying pipe 100 away from the material discharge outlet 110, and configured to temporarily store a material; the second material supply assembly 400 communicates with the material temporary storage assembly 200, and is configured to send the material to the material temporary storage assembly 200; the compressed air supply assembly 500 communicates with the material temporary storage assembly 200, and configured to provide high-pressure air that bursts the soil to form cracks or achieve an uplift effect, and simultaneously spray the materials temporarily stored in the material temporary storage assembly 200 to the cracks in cooperation with the material temporary storage assembly 200.

It will be appreciated that the material temporary storage assembly 200 is designed to temporarily store the material, and discharge the material, as required, to the interior of the material mixing and spraying pipe 100 for material transportation.

The second material supply assembly 400 can be used to send the material to be conveyed to the material temporary storage assembly 200 first, and then, while the compressed air supply assembly 500 sprays high-pressure air to the temporary storage assembly, the temporary storage assembly starts, so that the high-pressure air and the material enter the material mixing and spraying pipe 100 synchronously, as a result, the high-pressure air carrying the material moves synchronously to burst the soil to form cracks while the material is distributed in each crack.

Through the above settings, the material and high-pressure air can be jetted synchronously to carry out one shock, so that an effect of bursting the soil to form cracks can be achieved while the material can be sprayed to each crack, thereby increasing the work efficiency and reducing the energy consumption. In addition, the design of the second material supply assembly 400 can increase the storage amount of the material, thus further improving the scope of application of the device.

In general, the air-material mixing and spraying actuator provided by the embodiment of the present invention can achieve the large-scale and fast suspended spraying of materials in deep soil, so that the work efficiency is increased while the utilization rates of materials and energy are effectively improved.

Specifically, the material conveyed in this embodiment can be a compound fertilizer, an organic fertilizer, biogas slurry, soil amendment, or the like, and the state of the material is solid powder or liquid. However, in actual use, the device can also be used to spray other materials to the soil, which all fall within the scope of protection of the present application.

In addition, it will be appreciated that a mode of connecting the second material supply assembly 400 to the material mixing and spraying pipe 100 is a parallel connection mode, which can further increase the storage capacity of the material and is applicable to large-scale continuous fertilization.

Further, to enable the material temporary storage assembly 200 to fit in with the second material supply assembly 400 and the compressed air supply assembly 500 better, in this embodiment, the material temporary storage assembly 200 includes a shell 210 and a rotating core 220, where the shell 210 is disposed at the material mixing and spraying pipe 100, and the shell 210 is provided with a first straight-through hole 230, a second straight-through hole 240 and a third straight-through hole 250 which respectively communicate with the material mixing and spraying pipe 100, the second material supply assembly 400 and the compressed air supply assembly 500;

the rotating core 220 is rotatably disposed in the shell 210, has a temporary storage cavity, and is provided with a first central hole 270 and a second central hole 280 which communicate with the temporary storage cavity, and the central axes of the first central hole 270 and the second central hole 280 coincide with each other; and during the rotation of the rotating core 220, the temporary storage cavity can communicate with the air-pressured material supply assembly 300, the compressed air supply assembly 500 and the material mixing and spraying pipe 100.

Specifically, the central axes of the first straight-through hole 230 and the third straight-through hole 250 coincide with each other, and are located in a vertical plane, and the central axis of the second straight-through hole 240 is perpendicular to that of the first straight-through hole 230.

In a specific implementation process, the shell 210 can be set to a hollow ball type.

Specifically, a rotating motor configured to drive the rotating core 220 to rotate is installed at the shell 210.

It will be appreciated that the outer wall of the rotating core 220 is in gapless contact with the inner wall of the shell 210 so as to ensure the tightness of contact.

Based on the above design, through the rotation of the rotating core 220, the temporary storage cavity can communicate with the second material supply assembly 400, the compressed air supply assembly 500 and the material mixing and spraying pipe 100 respectively; when the rotating core 220 rotates to the first central hole 270 or the second central hole 280 to communicate with the second material supply assembly 400, the inner wall of the rotating core 220 closes the third straight-through hole 250 and the first straight-through hole 230, at this moment, and the second material supply assembly 400 can be used to send the material to the temporary storage cavity; when the rotating core 220 rotates to the first central hole 270 or the second central hole 280 to communicate with the first straight-through hole 230 and the third straight-through hole 250 respectively, the compressed air supply assembly 500 releases high pressure shock waves, then the high pressure shock waves pass through the temporary storage cavity and enter the material mixing and spraying pipe 100, and synchronously carry the material in the temporary storage cavity to enter the material mixing and spraying pipe 100, and the soil is burst to form cracks and the material enters the cracks synchronously.

Further, to improve the space of the temporary storage cavity, in this embodiment, a depression area 291 is provided on one side of the temporary storage cavity.

Specifically, to ensure the efficiency of rotation of the rotating core 220, in this embodiment, the shell 210 and the rotating core 220 are preferably designed in a spherical shape.

Specifically, the second material supply assembly 400 includes a second conveying pipe 410, a second material bucket 420 and a second conveying device 430; where one end of the second conveying pipe 410 communicates with the second straight-through hole 240, and the second material bucket 420 communicates with the second conveying pipe 410 and is configured to send the material to the second conveying pipe 410; and the second conveying device 430 is configured to send the material in the second conveying pipe 410 to the temporary storage cavity.

In this embodiment, the second conveying device 430 can be implemented in two ways:

the first way: the second conveying device 430 includes a cylinder body 432 and a piston 433 disposed at the cylinder body 432, a push rod 434 is disposed at one end of the piston 433, the push rod 434 is in transition fit with the second conveying pipe 410, and the length of the push rod 434 is greater than that of the second conveying pipe 410.

It will be appreciated that the transition fit indicates that the outer diameter of the push rod 434 is the same as the inner diameter of the second conveying pipe 410, and the push rod 434 can move in the axial direction of the second conveying pipe 410.

In this way, the push rod 434 is used to control the opening and closing of a junction of the second conveying pipe 410 and the second material bucket 420 while the push rod 434 is used to push a material; when an end portion of the push rod 434 moves to one side of the second conveying pipe 410 away from the temporary storage cavity, the second conveying pipe 410 communicates with the second material bucket 420, the material in the second material bucket 420 enters the second conveying pipe 410 with gravity, and then the push rod 434 moves toward the side where the temporary storage cavity is located, so that the material in the second conveying pipe 410 is pushed, and at the same time, the side wall of the push rod 434 can seal an end port of the second material bucket 420 so as to stop material supply. The above operations are repeated again and again to achieve material supply.

The second way: the second conveying device 430 includes a second ball valve 431, a cylinder body 432 and a piston 433 disposed in the cylinder body 432; the second ball valve 431 is disposed at the second conveying pipe 410, and the second ball valve 431 can communicate with the second material bucket 420;

the cylinder body 432 is located at the end of the second conveying pipe 410 away from the temporary storage assembly, a push rod 434 is disposed at one end of the piston 433, the push rod 434 is in transition fit with the inner cavity of the second ball valve 431, and the length of the push rod 434 is greater than that of the second conveying pipe 410;

In this way, the second ball valve 431 is used to control the conveying of a material in the second material bucket 420; when the second ball valve 431 rotates to communicate with the second material bucket 420, the material in the second material bucket 420 enters the inner cavity of the second ball valve 431; and when the second ball valve 431 continues to rotate to communicate with the second conveying pipe 410, the push rod 434 pushes the material in the inner cavity to the temporary storage cavity. This solution is preferred in this embodiment.

The above-mentioned two ways both are designed to quantitatively send the material in the second material bucket 420 to the second conveying pipe 410, and then push the material by using the push rod 434, so the two are only different in implementation ways, thus, all other solutions encompassed within the solution should be understood as being within the scope of protection of the present application.

Further, in order to perform the alternating conveying of a variety of materials, an air-pressured material supply assembly 300 is specially added in this embodiment, and the shell 210 is provided with a fourth straight-through hole 260 that communicates with the air-pressured material supply assembly 300; and during the rotation of the rotating core 220, the temporary storage cavity can communicate with the air-pressured material supply assembly 300.

Specifically, the air-pressured material supply assembly 300 includes a first material bucket 310, an air-pressured conveying device 320 and a first conveying pipe 330, where the first material bucket 310 communicates with the first conveying pipe 330, and is configured to send the material to the first conveying pipe 330, one end of the first conveying pipe 330 communicates with the fourth straight-through hole 260, and the other end thereof communicates with the air-pressured conveying device 320 so as to send the material to the temporary storage cavity.

Specifically, a control valve 340 is disposed at the first conveying pipe 330.

Moreover, the central axes of the fourth straight-through hole 260 and the second straight-through hole 240 coincide with each other, and located on both sides of the horizontal direction of the shell 210 respectively, and the first straight-through hole 230 and the third straight-through hole 250 are located on both sides of the vertical direction of the shell 210.

In this embodiment, the control valve 340 can be in the form of a two-way rotary ball valve, and achieves communication control through rotation.

In addition, in this embodiment, the air-pressured conveying device 320 can be implemented by using various implementation methods such as air pumps that can provide pressure, which can be referred to the conventional prior art and will not be described here.

In addition, to enable the rotating core 220 to fit in with the air-pressured material supply assembly 300 better, the rotating core 220 is provided with a third central hole 290 that communicates with the temporary storage cavity, the third central hole 290, the first central hole 270 and the second central hole 280 are located in a same rotation plane, and the central axis of the third central hole 290 is perpendicular to that of the first central hole 270; and when the rotating core 220 rotates to the first central hole 270 to communicate with the air-pressured material supply assembly 300, the third central hole 290 communicates with the material mixing and spraying pipe 100, so that the material, after passing through the first central hole 270, the temporary storage cavity and the third central hole 290, directly enters the material mixing and spraying pipe 100.

In addition, it will be appreciated that the rotation axis of the rotating core 220 is perpendicular to the central axis of the first central hole 270.

It also will be appreciated that in this embodiment, a conveying mechanism for conveying materials to the first conveying pipe 330 is disposed in the first material bucket 310. The conveying mechanism may adopt conventional prior arts such as a screw shaft conveying mechanism, a pneumatic conveying mechanism, a belt conveying mechanism, and the like, but is not limited to one of them. The screw shaft conveying mechanism is preferred in this solution.

When the first step of work starts, the rotating core 220 can be rotated to the first central hole 270 to communicate with the second straight-through hole 240 (at this time, the second central hole 280 communicates with the fourth straight-through hole 260, the third central hole 290 communicates with the third straight-through hole 250); the second material supply assembly 400 conveys the material to the temporary storage cavity; then the rotating core 220 is rotated 90 DEG counterclockwise to the first central hole 270 to communicate with the third straight-through hole 250 (at this time, the second central hole 280 communicates with the first straight-through hole 230, and the third central hole 290 communicates with the fourth straight-through hole 260); the compressed air supply assembly 500 is turned on, so that high-pressure air is released to pass through the temporary storage cavity, and carries the material to pass through the material mixing and spraying pipe 100, then the soil is burst to form cracks, and the material is conveyed to the cracks synchronously (the cracks are supported by the material to prevent crack closure); then, the rotating core 220 continues to be rotated 90 DEG counterclockwise to the first central hole 270 to communicate with the fourth straight-through hole 260 (at this time, the second central hole 280 communicates with the second straight-through hole 240, and the third central hole 290 communicates with the first straight-through hole 230), the air-pressured material supply assembly 300 is turned on, and the material in the air-pressured material supply assembly 300 is pushed through pressure, so that the material, after passing through the first central hole 270, the temporary storage cavity and the third central hole 290, enters the material mixing and spraying pipe 100, and finally enters the cracks.

Through the above design, the material supply of different materials can be achieved by using the air-pressured material supply assembly 300 and the second material supply assembly 400, so that a problem of inconvenience caused by conveying different materials by a single material supply assembly is overcome, thereby further improving the scope of application of the device; and the compressed air supply assembly 500 can achieve the continuous conveying of materials just through one operation, thereby greatly improving the work efficiency, and reducing the energy consumption.

In this embodiment, the compressed air supply assembly 500 is a pneumatic shock wave generator that bursts the soil to form cracks by providing high-pressure air shock waves, which is a conventional prior art and will not be described here.

In this embodiment, an insertion portion 120 is disposed at the lower end of the material spraying and mixing pipe, the insertion portion 120 is in a conical structure, and a plurality of spraying and mixing nozzles 130 that communicate with the material spraying and mixing pipe are disposed on the side wall of the insertion portion 120.

In this embodiment, the air-material mixing and spraying actuator is also connected to a control system for controlling the rotation of the rotating core 220, the turning on and off of the control valve 340, the rotation of the second ball valve 430, the movement of the piston 433, the opening and closing of the compressed air supply assembly, etc. Such control system is a conventional control mode in the art, and will not be described here.

Figure 5:
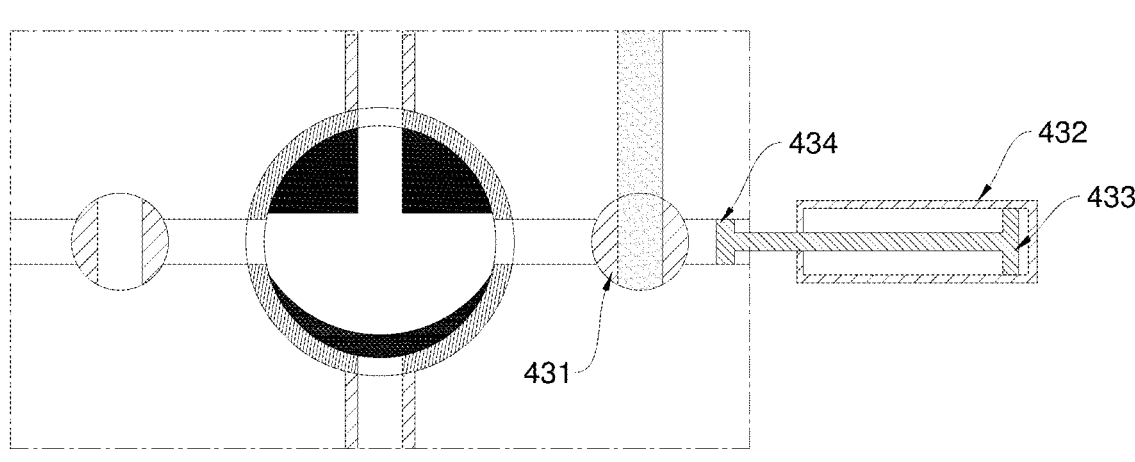
FIG. 5 shows a structural schematic drawing of the second material supply assembly according to the embodiment of the present invention.
Figure 6:
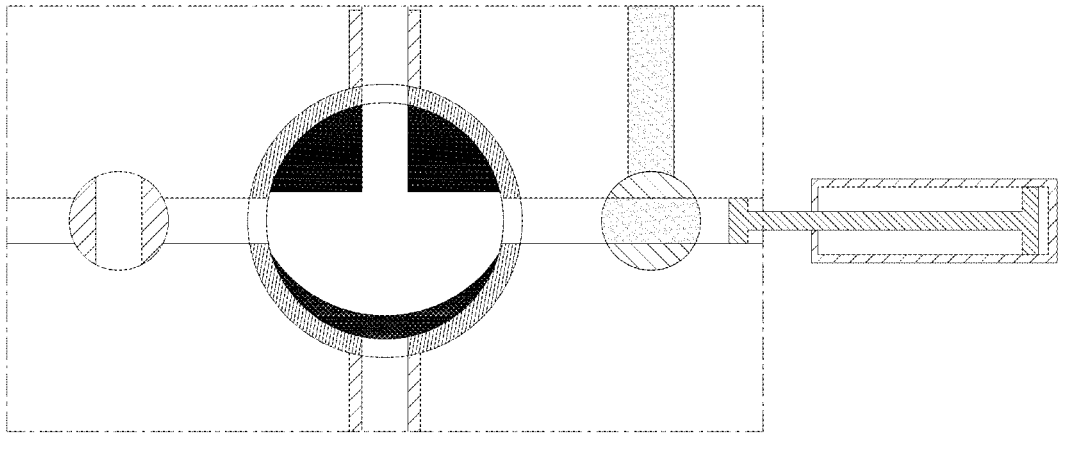
FIG. 6 shows a structural schematic drawing of the rotation of the second ball valve according to the embodiment of the present invention.
Figure 7:
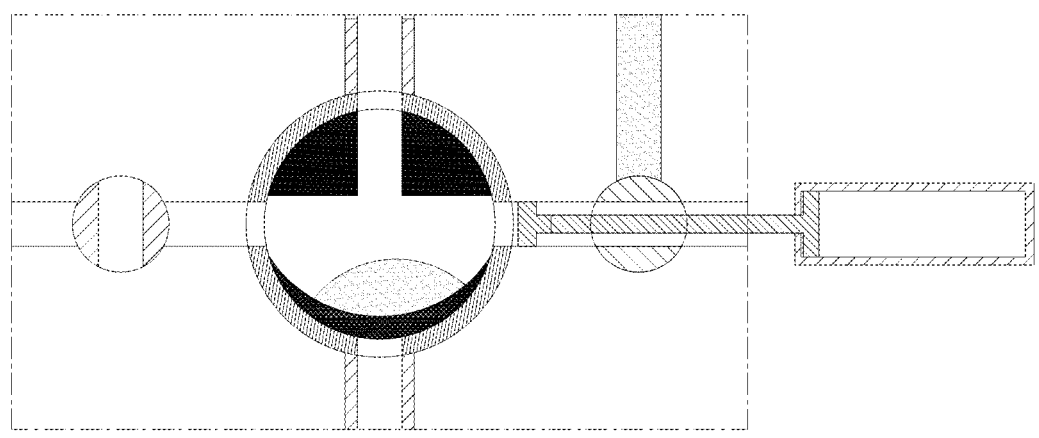
FIG. 7 shows a schematic drawing of an operating state of the second material supply assembly according to the embodiment of the present invention.
Figure 8:
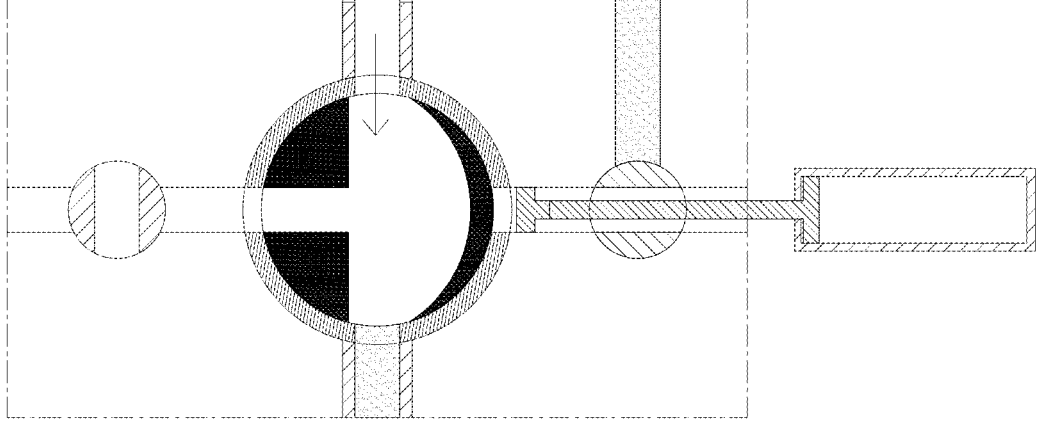
FIG. 8 shows a schematic drawing I of an operating state of the material temporary storage assembly according to the embodiment of the present invention.
Figure 9:
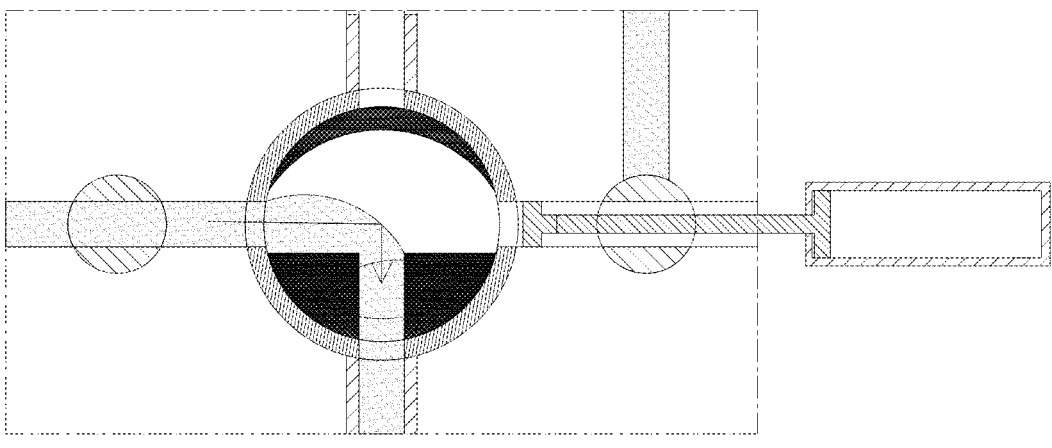
FIG. 9 shows a schematic drawing II of an operating state of the material temporary storage assembly according to the embodiment of the present invention.

An application method of the air-material mixing and spraying actuator includes the following steps:

S1: different materials are temporarily stored in the first material bucket 310 and the second material bucket 420 respectively;

S2: first, the rotation of the rotating core 220 is controlled to an initial position, at this time, the first central hole 270 communicates with the second straight-through hole 240, the second central hole 280 communicates with the fourth straight-through hole 260, and the third central hole 290 communicates with the third straight-through hole 250;

the control valve 340 is turned off, so that the first conveying pipe 330 is disconnected from the temporary storage cavity;

the second ball valve 431 rotates to communicate with the second material bucket 420 (as shown in FIG. 5), so that the materials in the second material bucket 420 enter the inner cavity of the second ball valve 431; then, the second ball valve 431 rotates to communicate with the second conveying pipe 410 (as shown in FIG. 6); the second conveying device 430 starts, so that the motion of the piston 433 drives the push rod 434 to move so as to send the materials in the inner cavity of the second ball valve 431 to the temporary storage cavity (as shown in FIG. 7);

S3: the rotating core 220 rotates 90 DEG counterclockwise (as shown in FIG. 8), so that the first central hole 270 communicates with the third straight-through hole 250, the second central hole 280 communicates with the first straight-through hole 230; the compressed air supply assembly 500 starts, so that high-pressure shock wave air carries the materials to pass through the material mixing and spraying pipe 100, then the soil is burst to form cracks, and the materials are in the cracks, thereby completing the initial application of the materials (the cracks are supported by the material to prevent crack closure);

S4: the rotating core 220 continues to rotate 90 DEG counterclockwise (as shown in FIG. 9), so that the first central hole 270 communicates with the fourth straight-through hole 260, and the third central hole 290 communicates with the first straight-through hole 230; the control valve 340 is turned on, the materials in the first material bucket 310 are conveyed to the first conveying pipe 330 through the conveying mechanism, and quickly conveyed through the air-pressured conveying device 320, so that the materials pass through the first central hole 270, the temporary storage cavity and the material mixing and spraying pipe 100 to reach the cracks, thereby completing second material application (the second material application can be performed continuously).

Figures 10, 11:
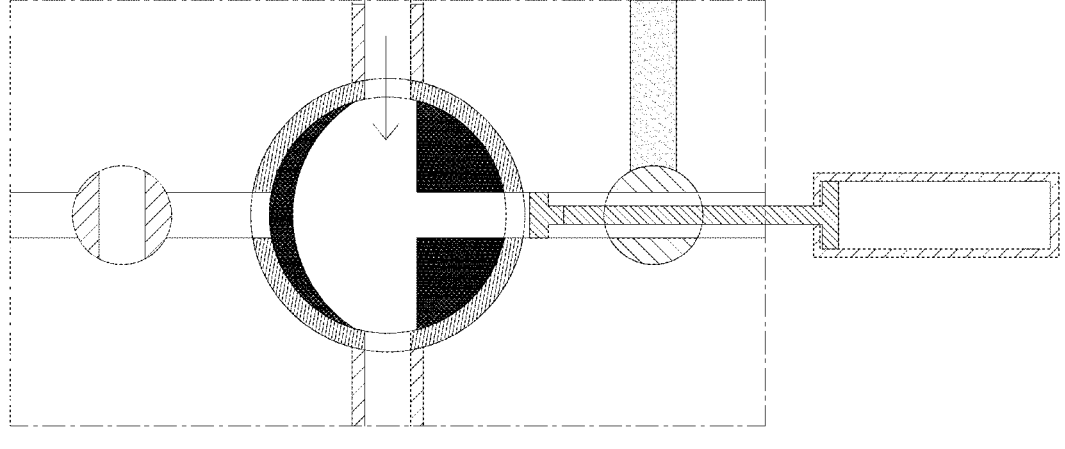
FIG. 10 shows a schematic drawing III of an operating state of the material temporary storage assembly according to the embodiment of the present invention.
FIG. 11 shows a schematic drawing IV of an operating state of the material temporary storage assembly according to the embodiment of the present invention.

S5: the rotating core 220 continues to rotate 90DEG counterclockwise (as shown in FIG. 10), so that the first central hole 270 communicates with the first straight-through hole 230, the second central hole 280 communicates with the third straight-through hole 250; the compressed air supply assembly starts, high-pressure air shock waves are released again; and the shock waves pass through the second central hole 280, the temporary storage cavity, the first central hole 270 and the material mixing and spraying pipe 100 to complete the cleaning of the device; and S6: the rotating core 220 continues to rotate 90 DEG counterclockwise to return to the initial position (as shown in FIG. 11).

In summary, the present invention can achieve the large-scale and fast spraying of materials in deep soil, so that the work efficiency is increased while the utilization rates of materials and energy are effectively improved.

The foregoing disclosure is merely a preferred embodiment of the present invention but is not intended to limit the present invention, and for those skilled in the art, various variations and changes may be made to the present invention. Any modifications, equivalent substitutions and improvements and the like made within the spirit and principle of the present invention shall be encompassed in the scope of protection of the present invention.

What is claimed is:

1. An air-material mixing and spraying actuator, comprising:

a material mixing and spraying pipe, and a material discharge outlet being provided at one end thereof;

a material temporary storage assembly disposed at one end of the material mixing and spraying pipe away from the material discharge outlet and configured to temporarily store materials;

a second material supply assembly communicating with the material temporary storage assembly and configured to send the material to the material temporary storage assembly; and a compressed air supply assembly communicating with the material temporary storage assembly and configured to provide high-pressure air that bursts the soil to form cracks or achieve an uplift effect, and simultaneously spray the material temporarily stored in the material temporary storage assembly to the cracks in cooperation with the material temporary storage assembly, wherein the compressed air supply assembly is a pneumatic shock wave generator; and the material temporary storage assembly comprises a shell and a rotating core, wherein the shell is disposed at the material mixing and spraying pipe and is provided with a first straight-through hole, a second straight-through hole and a third straight-through hole which communicate with the material mixing and spraying pipe, the second material supply assembly, and the compressed air supply assembly respectively;

the rotating core is rotatably disposed in an inner cavity of the shell, has a temporary storage cavity, and is provided with a first central hole and a second central hole which communicate with the temporary storage cavity, and the central axes of the first central hole and the second central hole coincide with each other; and during the rotation of the rotating core, the temporary storage cavity is configured to communicate with the first straight-through hole, the second straight-through hole and the third straight-through hole through the first central hole and the second central hole.

2. The air-material mixing and spraying actuator according to claim 1, wherein a depression area is disposed on one side of the temporary storage cavity.

3. The air-material mixing and spraying actuator according to claim 1, wherein the second material supply assembly comprises a second conveying pipe, a second material bucket, and a second conveying device; wherein one end of the second conveying pipe communicates with the second straight-through hole, and the second material bucket communicates with the second conveying pipe and is configured to send the material to the second conveying pipe; and the second conveying device is configured to send the material in the second conveying pipe to the temporary storage cavity.

4. The air-material mixing and spraying actuator according to claim 3, wherein the second conveying device comprises a cylinder body and a piston disposed in the cylinder body, a push rod is disposed at one end of the piston, the push rod is in transition fit with the second conveying pipe, and the length of the push rod is greater than that of the second conveying pipe.

5. The air-material mixing and spraying actuator according to claim 3, wherein the second conveying device comprises a second ball valve, a cylinder body, and a piston disposed in the cylinder body; wherein the second ball valve is disposed at the second conveying pipe, and can communicate with the second material bucket;

the cylinder body is located at one end of the second conveying pipe away from the temporary storage assembly, a push rod is disposed at one end of the piston, the push rod is in transition fit with an inner cavity of the second conveying pipe, and the length of the push rod is greater than that of the second conveying pipe; and when the second ball valve rotates to communicate with the second material bucket, the material in the second material bucket enters an inner cavity of the second ball valve; and when the second ball valve continues to rotate to communicate with the second conveying pipe, the push rod pushes the material in the inner cavity of the second ball valve to the temporary storage cavity.

6. The air-material mixing and spraying actuator according to claim 1, wherein the air-material mixing and spraying actuator further comprises an air-pressured material supply assembly, and the shell is provided with a fourth straight-through hole that communicates with the air-pressured material supply assembly; and, during the rotation of the rotating core, the temporary storage cavity is configured to communicate with the air-pressured material supply assembly.

7. The air-material mixing and spraying actuator according to claim 6, wherein the air-pressured material supply assembly comprises a first material bucket, an air- pressured conveying device, and a first conveying pipe, wherein the first material bucket communicates with the first conveying pipe and is configured to send the material to the first conveying pipe, one end of the first conveying pipe communicates with the fourth straight- through hole, and the other end thereof communicates with the air-pressured conveying device so as to send the material to the temporary storage cavity; and a control valve is disposed at the first conveying pipe.

8. The air-material mixing and spraying actuator according to claim 6, wherein the rotating core is provided with a third central hole that communicates with the temporary storage cavity, the third central hole, the first central hole and the second central hole are located in a same rotation plane, and the central axis of the third central hole is perpendicular to that of the first central hole; and when the rotating core rotates to the first central hole to communicate with the air- pressured material supply assembly, the third central hole communicates with the material mixing and spraying pipe, so that the material, after passing through the first central hole, the temporary storage cavity and the third central hole, directly enters the material mixing and spraying pipe.

9. An application method of the air-material mixing and spraying actuator according to claim 8, comprising the following steps:

S1: rotating the rotating core to the first central hole to communicate with the second material supply assembly, and the second central hole communicates with the air-pressured material supply assembly;

S2: starting the second material supply assembly, so that the material enters the temporary storage cavity;

S3: rotating the rotating core 90 degrees counterclockwise to the first central hole to communicate with the compressed air supply assembly, at this moment, the second central hole communicates with the material mixing and spraying pipe;

S4: starting the compressed air supply assembly, so that high-pressure air is released to pass through the temporary storage cavity, and carries the material to pass through the material mixing and spraying pipe to burst the soil to form cracks, and the material is sprayed to the cracks synchronously;

S5: rotating the rotating core rotates 90 degrees counter-clockwise to the first central hole to communicate with the air-pressured material supply assembly, and the third central hole communicates with the material mixing and spraying pipe; and S6: starting the air-pressured material supply assembly, so that the material in the air- pressured material supply assembly, after passing through the first central hole, the temporary storage cavity and the third central hole, enters the material mixing and spraying pipe, and finally enters the cracks.

* * * * *